US012587536B1

(12) United States Patent
  Goldenberg et al.

(10) Patent No.: US 12,587,536 B1
(45) Date of Patent: Mar. 24, 2026

(54) SYSTEM AND METHOD FOR IDENTITY MODELING AND EFFECTIVE PERMISSION MANAGEMENT

(71) Applicant: Linx Ltd., Tel Aviv (IL)

(72) Inventors: Niv Goldenberg, Brooklyn, NY (US); Matan Haimovitch, Tel Aviv (IL); Uri Ezra, Tel Aviv (IL); Hila Ohayon Bahri, Yavne (IL); Gil Golub, Tel Aviv (IL)

(73) Assignee: Linx Ltd., Tel Aviv (IL)

( * ) Notice: Subject to any disclaimer, the term of this patent is extended or adjusted under 35 U.S.C. 154(b) by 0 days.

(21) Appl. No.: 19/022,586

(22) Filed: Jan. 15, 2025

(51) Int. Cl.
  *H04L 9/40* (2022.01)
(52) U.S. Cl.
  CPC ................................. *H04L 63/102* (2013.01)
(58) Field of Classification Search
  CPC ...................................................... H04L 63/102
  See application file for complete search history.

(56) References Cited

U.S. PATENT DOCUMENTS

| | | | | |
|---|---|---|---|---|
| 10,243,945 | B1 * | 3/2019 | Kruse | .................... H04L 63/126 |
| 10,375,201 | B2 | 8/2019 | Bergeson et al. | |
| 10,554,665 | B1 * | 2/2020 | Badawy | .................... G06F 21/45 |
| 10,673,840 | B2 | 6/2020 | Shukla et al. | |
| 10,771,337 | B1 | 9/2020 | Das et al. | |
| 10,778,691 | B1 * | 9/2020 | Kissell | .................. H04L 63/104 |
| 10,880,159 | B1 * | 12/2020 | Khoo | .................. H04L 41/0803 |
| 10,972,444 | B1 * | 4/2021 | Schiesser | ................ H04L 63/10 |
| 10,992,657 | B1 * | 4/2021 | Stevens | ................. H04L 63/102 |
| 11,038,891 | B2 | 6/2021 | Wu et al. | |
| 11,373,176 | B2 * | 6/2022 | Chilton | ........... G06Q 20/40145 |
| 11,870,857 | B1 * | 1/2024 | Padmanabhan | ......... G06F 3/067 |
| 2003/0149781 | A1 * | 8/2003 | Yared | .................. H04L 63/0815 709/228 |
| 2007/0233600 | A1 * | 10/2007 | McMahon | ............. G06Q 10/06 705/51 |
| 2008/0168539 | A1 * | 7/2008 | Stein | ................... H04L 63/0815 726/5 |
| 2011/0162034 | A1 * | 6/2011 | Nagaratnam | ......... G06F 21/604 726/4 |
| 2011/0202986 | A1 * | 8/2011 | Horn | .................. H04L 63/0815 726/7 |

(Continued)

*Primary Examiner* — Jason Chiang
(74) *Attorney, Agent, or Firm* — M&B IP Analysts, LLC

(57) ABSTRACT

A system and method for identity modeling and effective permission management in a cloud computing environment is presented. The method includes accessing a first identity provider system to detect a first identity, the first identity including a first permission; accessing a second identity provider system to detect a second identity, the second identity including a second permission; generating in a control database a representation of a canonical identity; generating in the control database a representation of the first identity, and a representation of the second identity; generating in the control database a connection between canonical identity and: the representation of the first identity, and the representation of the second identity; representing the first permission and the second permission in the control database; and determining an effective permission for the canonical identity based on each identity representation connected to the canonical identity.

19 Claims, 6 Drawing Sheets

(56)          References Cited

U.S. PATENT DOCUMENTS

| | | | |
|---|---|---|---|
| 2012/0005739 A1* | 1/2012 | Kassaei | G06F 21/41 |
| | | | 726/8 |
| 2014/0075492 A1* | 3/2014 | Kapadia | G06F 21/604 |
| | | | 726/1 |
| 2015/0012433 A1* | 1/2015 | Yang | G06Q 20/3265 |
| | | | 705/35 |
| 2015/0156192 A1* | 6/2015 | Yang | H04L 63/0815 |
| | | | 726/6 |
| 2017/0374070 A1* | 12/2017 | Shah | H04L 63/20 |
| 2018/0278614 A1* | 9/2018 | Miller | G06F 21/604 |
| 2018/0322587 A1* | 11/2018 | Linne | H04L 63/105 |
| 2019/0007392 A1* | 1/2019 | Rubiyath | G06F 21/31 |
| 2019/0261169 A1* | 8/2019 | Kamal | H04L 63/0807 |
| 2019/0318100 A1* | 10/2019 | Bhatia | G06F 21/554 |
| 2020/0244645 A1* | 7/2020 | Lingampally | G06F 21/41 |
| 2020/0366678 A1* | 11/2020 | Mutha | H04L 63/0815 |
| 2020/0372600 A1* | 11/2020 | Bloy | G06Q 50/265 |
| 2021/0112065 A1* | 4/2021 | Yang | H04L 63/108 |
| 2021/0377252 A1* | 12/2021 | Monro | H04L 63/0884 |
| 2021/0399892 A1* | 12/2021 | Bankston | H04L 9/3213 |
| 2022/0166763 A1* | 5/2022 | Hong | H04L 67/10 |
| 2022/0247767 A1* | 8/2022 | Borah | H04L 63/1425 |
| 2022/0247789 A1* | 8/2022 | Itoi | G06F 3/0482 |
| 2022/0292584 A1* | 9/2022 | Kumar | H04L 9/3213 |
| 2022/0342976 A1* | 10/2022 | Stoyanov | H04L 63/0807 |
| 2023/0032863 A1* | 2/2023 | Bolser | G06F 21/604 |
| 2023/0093470 A1* | 3/2023 | Dvornik | H04L 67/306 |
| | | | 726/7 |
| 2023/0319055 A1* | 10/2023 | Smyth | H04L 63/102 |
| | | | 726/4 |
| 2024/0078295 A1* | 3/2024 | Philippe | H04L 63/102 |
| 2024/0143598 A1* | 5/2024 | Roy | G06F 16/24578 |
| 2024/0359318 A1* | 10/2024 | Cristache | B25J 5/007 |
| 2025/0023878 A1* | 1/2025 | Sathaye | H04L 63/083 |
| 2025/0047661 A1* | 2/2025 | Berbenetz | H04L 67/306 |

* cited by examiner

SYSTEM AND METHOD FOR IDENTITY MODELING AND EFFECTIVE PERMISSION MANAGEMENT

TECHNICAL FIELD

The present disclosure relates generally to access management in cloud computing, and specifically to managing access for users utilizing multiple accounts across multiple cloud computing environments.

BACKGROUND

An Identity Provider (IdP) is a system or service that manages digital identities and facilitates user authentication for accessing applications or resources. IdPs handle identity verification, store user credentials, and issue authentication tokens (e.g., SAML assertions, OIDC tokens). They are central to Single Sign-On (SSO) systems, allowing users to log in once to access multiple resources. Examples include Okta®, Microsoft® Azure AD, and Google® Workspace. IdPs play a critical role in enabling secure, centralized, and streamlined access management across various platforms and services.

Challenges in determining effective permissions arise from the complexity of access control systems. Permissions are often layered, combining direct assignments, group memberships, role-based access, and policies with conditions. Identifying the true level of access requires evaluating all these layers and resolving conflicts, such as overlaps between grants and explicit denials. In large organizations or cloud environments, this complexity increases with the number of users, roles, and resources, making it difficult to accurately assess permissions.

A problem with effective permissions is the potential for excessive or unintended access. Misconfigurations, inherited permissions, or overly permissive roles can lead to users or systems having access beyond what is necessary for their function, violating the principle of least privilege. This increases the risk of unauthorized access, data breaches, or misuse of resources. Conversely, overly restrictive settings can hinder productivity by denying legitimate access. Determining effective permissions in a way that balances security and functionality is a persistent challenge in identity and access management.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In one general aspect, a method may include accessing a first identity provider system to detect a first identity, the first identity including a first permission. The method may also include accessing a second identity provider system to detect a second identity, the second identity including a second permission. The method may furthermore include generating in a control database a representation of a canonical identity. The method may in addition include generating in the control database a representation of the first identity, and a representation of the second identity. The method may moreover include generating in the control database a connection between canonical identity and: the representation of the first identity, and the representation of the second identity. The method may also include representing the first permission and the second permission in the control database. The method may furthermore include determining an effective permission for the canonical identity based on each identity representation connected to the canonical identity. Other embodiments of this aspect include corresponding computer systems, apparatus, and computer programs recorded on one or more computer storage devices, each configured to perform the actions of the methods.

Implementations may include one or more of the following features. The method may include: generating the connection between the canonical identity and the representation of the first identity and the representation of the second identity in response to determining that the first identity and the second identity are associated identities. The method may include: determining that the first identity and the second identity are associated identities in response to determining a similarity between the first identity and the second identity. The method may include: determining the similarity based on a computed semantic similarity. The method may include: detecting a third identity in a second identity provider system; generating a representation of the third identity in the control database; and connecting the representation of the third identity to the canonical identity in response to determining that the third identity is associated with any one of: the canonical identity, the first identity, and the second identity. The method may include: generating a second canonical identity in response to determining that the third identity is not associated with any one of: the canonical identity, the first identity, and the second identity; and connecting the representation of the third identity to the second canonical identity. The method may include: applying a control on the effective permission. The method may include: initiating a mitigation action in the cloud computing environment in response to determining that a condition of the control is satisfied. The method may include: initiating a mitigation action in the cloud computing environment in response to determining that a condition of the control is not satisfied. Implementations of the described techniques may include hardware, a method or process, or a computer tangible medium.

In one general aspect, a non-transitory computer-readable medium may include one or more instructions that, when executed by one or more processing circuitries of a device, cause the device to: access a first identity provider system to detect a first identity, the first identity including a first permission; access a second identity provider system to detect a second identity, the second identity including a second permission; generate in a control database a representation of a canonical identity; generate in the control database a representation of the first identity, and a representation of the second identity; generate in the control database a connection between canonical identity. The non-transitory computer-readable medium may also include the representation of the first identity, and the representation of the second identity; represent the first permission and the second permission in the control database; and determine an effective permission for the canonical identity based on each identity representation connected to the canonical identity. Other embodiments of this aspect include corresponding computer systems, apparatus, and computer programs recorded on one or more computer storage devices, each configured to perform the actions of the methods.

In one general aspect, a system may include one or more processing circuitries configured to: include access a first identity provider system to detect a first identity, the first identity including a first permission. The system may furthermore access a second identity provider system to detect a second identity, the second identity including a second permission. The system may in addition generate in a control database a representation of a canonical identity. The system may moreover generate in the control database a representation of the first identity, and a representation of the second identity. The system may also generate in the control database a connection between canonical identity. The system may furthermore include the representation of the first identity, and the representation of the second identity. The system may in addition represent the first permission and the second permission in the control database. The system may moreover determine an effective permission for the canonical identity based on each identity representation connected to the canonical identity. Other embodiments of this aspect include corresponding computer systems, apparatus, and computer programs recorded on one or more computer storage devices, each configured to perform the actions of the methods.

Implementations may include one or more of the following features. The system where the one or more processing circuitries are further configured to: generate the connection between the canonical identity and the representation of the first identity and the representation of the second identity in response to determining that the first identity and the second identity are associated identities. The system where the one or more processing circuitries are further configured to: determine that the first identity and the second identity are associated identities in response to determining a similarity between the first identity and the second identity. The system where the one or more processing circuitries are further configured to: determine the similarity based on a computed semantic similarity. The system where the one or more processing circuitries are further configured to: detect a third identity in a second identity provider system; generate a representation of the third identity in the control database; and connect the representation of the third identity to the canonical identity in response to determining that the third identity is associated with any one of: the canonical identity, the first identity, and the second identity. The system where the one or more processing circuitries are further configured to: generate a second canonical identity in response to determining that the third identity is not associated with any one of: the canonical identity, the first identity, and the second identity; and connect the representation of the third identity to the second canonical identity. The system where the one or more processing circuitries are further configured to: apply a control on the effective permission. The system where the one or more processing circuitries are further configured to: initiate a mitigation action in the cloud computing environment in response to determining that a condition of the control is satisfied. The system where the one or more processing circuitries are further configured to: initiate a mitigation action in the cloud computing environment in response to determining that a condition of the control is not satisfied. Implementations of the described techniques may include hardware, a method or process, or a computer tangible medium.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
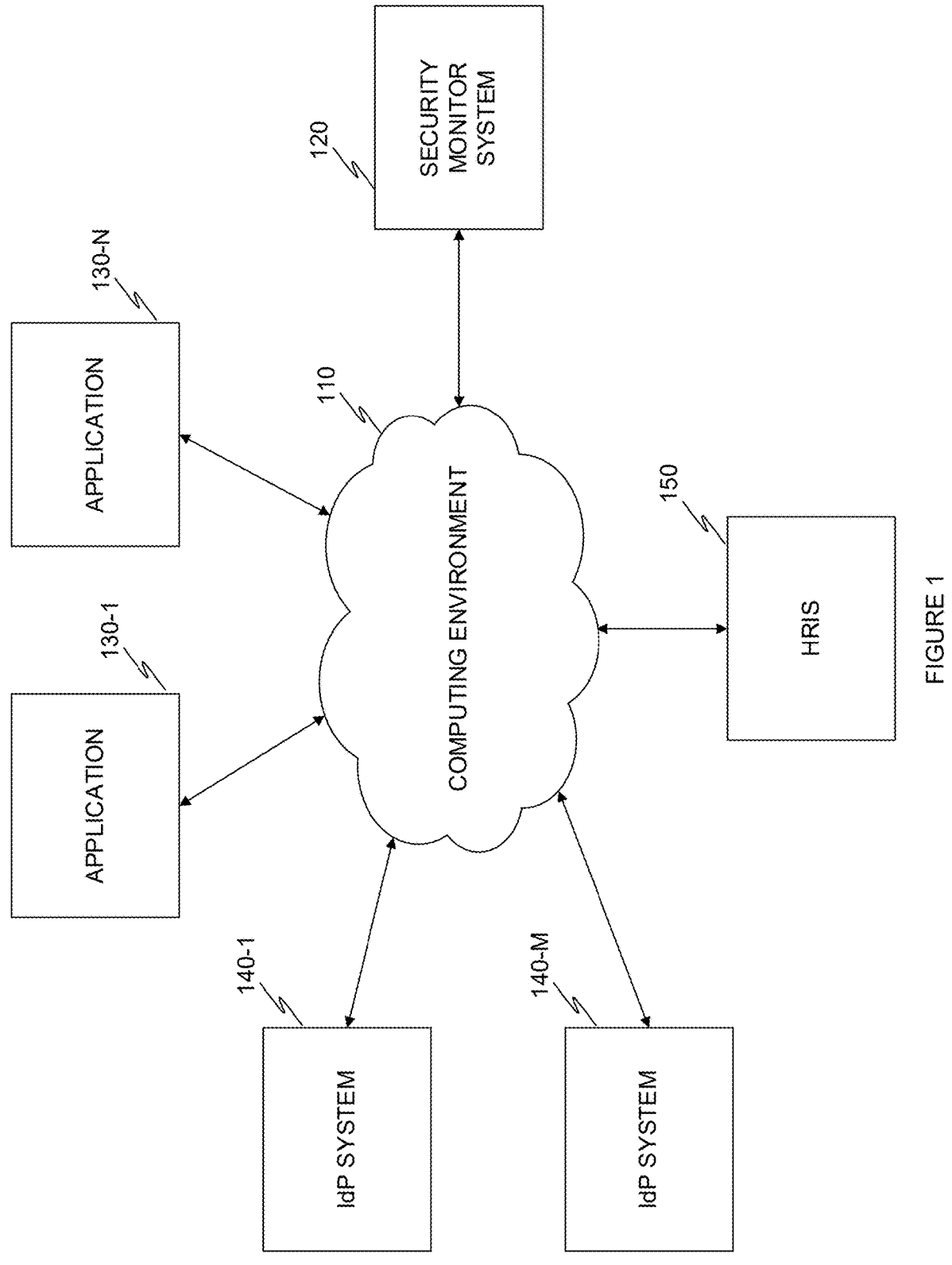
FIG. 1 is an example diagram of a computing environment having a security monitor system for managing access, implemented in accordance with an embodiment.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

FIG. 1 is an example diagram of a computing environment having a security monitor system for managing access, implemented in accordance with an embodiment. In an embodiment, a computing environment 110 includes a plurality of resources, principals, and the like.

For example, the computing environment 110 is a cloud computing environment, an on-prem computing environment, a networked computing environment, a combination thereof, and the like. In an embodiment, a cloud computing environment includes a virtual private cloud (VPC), a virtual network (VNet), a virtual private network (VPN), a combination thereof, and the like. In some embodiments, a cloud computing environment is deployed on a cloud computing infrastructure, such as Amazon® Web Service (AWS), Google® Cloud Platform (GCP), Microsoft® Azure, and the like.

In an embodiment, a resource is an entity deployed in the computing environment, such as a physical resource, a virtual resource, a combination thereof, and the like. For example, in an embodiment, a virtual resource is a virtual machine, a software container, a serverless function, a combination thereof, and the like. In certain embodiments, a resource is software based, such as an application, an appliance, a software service, a combination thereof, and the like.

In some embodiments, a principal is an entity which is authorized to act on a resource, initiate an action in the computing environment 110, and the like. In an embodiment, a principal is a user account, a service account, a role, a user group, an identity, and the like. In certain embodiments, a principal is associated with a permission, a policy, and the like, which dictate what actions a principal is authorized to initiate, for example.

According to an embodiment, a security monitor system 120 includes an analyzer, which is configured to analyze principals and associated permissions, as discussed in more detail herein. In an embodiment, the computing environment 110 is further connected to a plurality of applications 130-1 through 130-N, referred to individually as application 130 and collectively as applications 130, where 'N' is an integer having a value of '2' or greater.

In an embodiment, an application 130 is provided by a software as a service (Saas) provider utilizing, for example, a Snowflake® account, a Salesforce® account, an AWS® account, a Github® account, and the like.

In some embodiments, the computing environment 110 further includes, or otherwise is provided services by, an identity provider (IdP) system, such as IdP systems 140-1 through 140-M, referred to collectively as IdP systems 140 and individually as IdP system 140, where 'M' is an integer having a value of '2' or greater.

In an embodiment, an IdP system 140 is, for example, Okta®, Microsoft® Active Directory, and the like. In certain embodiments, the IdP system 140 includes an identity and access management (IAM) service. According to an embodiment, an IdP system 140 is configured to provide permissions, access, and the like, to a plurality of user accounts, service accounts, etc.

In certain embodiments, the cloud computing environment 110 further utilizes a human resources information system (HRIS) 150. Some HRIS systems are, for example, Workday, HiBob, BambooHR, SAP SuccessFactors, and the like.

A human user, such as Alice, who is a user of the computing environment, might have an email account with a first provider (e.g., application 130-1), a Snowflake account from a second provider (e.g., application 130-N) with a multi-factor authentication (MFA) provided by Okta (e.g., IdP system 140-1). Each of these systems has an account for Alice, a single human, and each such account is a principal.

According to an embodiment, it is advantageous to associate a single human user (e.g., Alice) with each and every account which the user uses when accessing the computing environment 110, connected components thereof (e.g., applications 130), and the like. Throughout this disclosure the term 'user' is used both in the context of a human operator and in the context of a user account. The terms are not necessarily used interchangeably and context should inform the reader unless stated otherwise.

Figure 2:
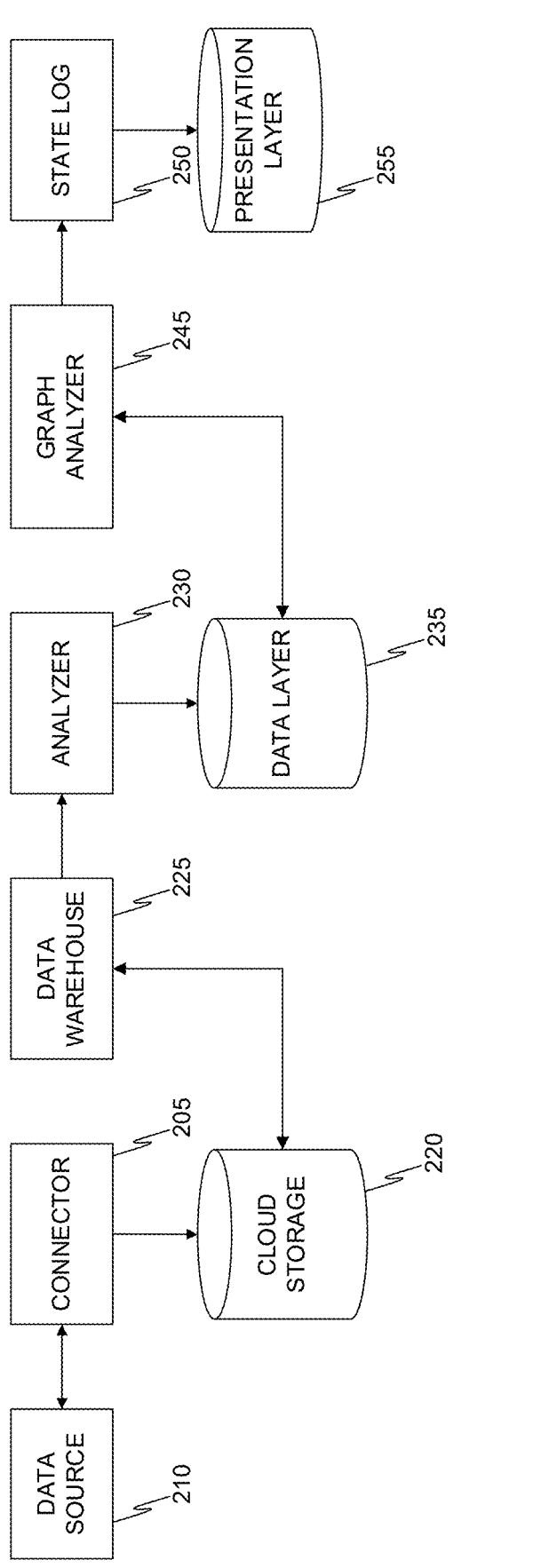
FIG. 2 is an example diagram of an identity data layer for an identity and permission analyzer, implemented in accordance with an embodiment.

FIG. 2 is an example diagram of an identity data layer for an identity and permission analyzer, implemented in accordance with an embodiment. In an embodiment, an analyzer 230 is configured to receive information from a plurality of data sources, such as data source 210.

According to an embodiment, a data source 210 is an application, such as application 130, an IdP system, such as IdP system 140, and the like. In an embodiment, each data source is connected via a connector 205 to a cloud storage 220 into which extracted data is stored. For example, in an embodiment, the connector 205 is a data pipeline, path, stream, and the like, and includes, for example, a virtual private network.

In some embodiments, the cloud storage 220 is, for example, a bucket in AWS. In certain embodiments, data extracted from the data source is then stored in a data store, such as data warehouse 225, which is implemented as a data lake, a data warehouse, a combination thereof, and the like. For example, in an embodiment, the data warehouse 225 is implemented utilizing Snowflake®.

In certain embodiments, the analyzer 230 is configured to access the data stored in the data warehouse 225. In an embodiment, the analyzer 230 is configured to detect a plurality of user accounts, and determine a canonical user account associated with each detected account. In an embodiment, a canonical user refers to a single user, operator, human, etc., which utilizes one or more accounts in a computing environment. For example, Alice is a canonical user.

In an embodiment, the analyzer 230 is configured to determine that a first user account and a second user account are related to a single canonical user, and generate a representation, for example in a data layer 235, of the canonical user, the first user account, and the second user account. In some embodiments, the analyzer 230 is configured to determine that a first user account is associated with a first canonical user, and a second user account is associated with a second canonical user.

According to an embodiment, the analyzer 230 is configured to generate a semantic score between a first user account and a second user account, to determine if the user accounts are related to the same canonical user, each to a different canonical user, etc.

In an embodiment, a graph analyzer 245 is configured to generate insights based on the determined canonical users, permissions, user accounts, and the like, which are stored as a representation in the data layer 235. For example, in an embodiment, the graph analyzer 245 is configured to apply a policy, a conditional rule, and the like, on the representation stored in the data layer 235, to detect, for example, a partially off-boarded user, a high risk user without MFA enabled, a local account, a system account, and the like.

In some embodiments, insights are generated based on data records in a state log 250. In some embodiments, the state log is rendered for display as a presentation layer 255, which provides a visual presentation of the data layer 235, insights of the data layer, and the like, which is digestible by a human user in a convenient way. In certain embodiments, the state log 250 includes a state of each identity.

According to an embodiment, a state of an entity includes an event respective of an entity, an event type, a timestamp, etc. In an embodiment, where a change is detected in the state of an entity, a control may be applied to detect a cybersecurity risk.

Figure 3:
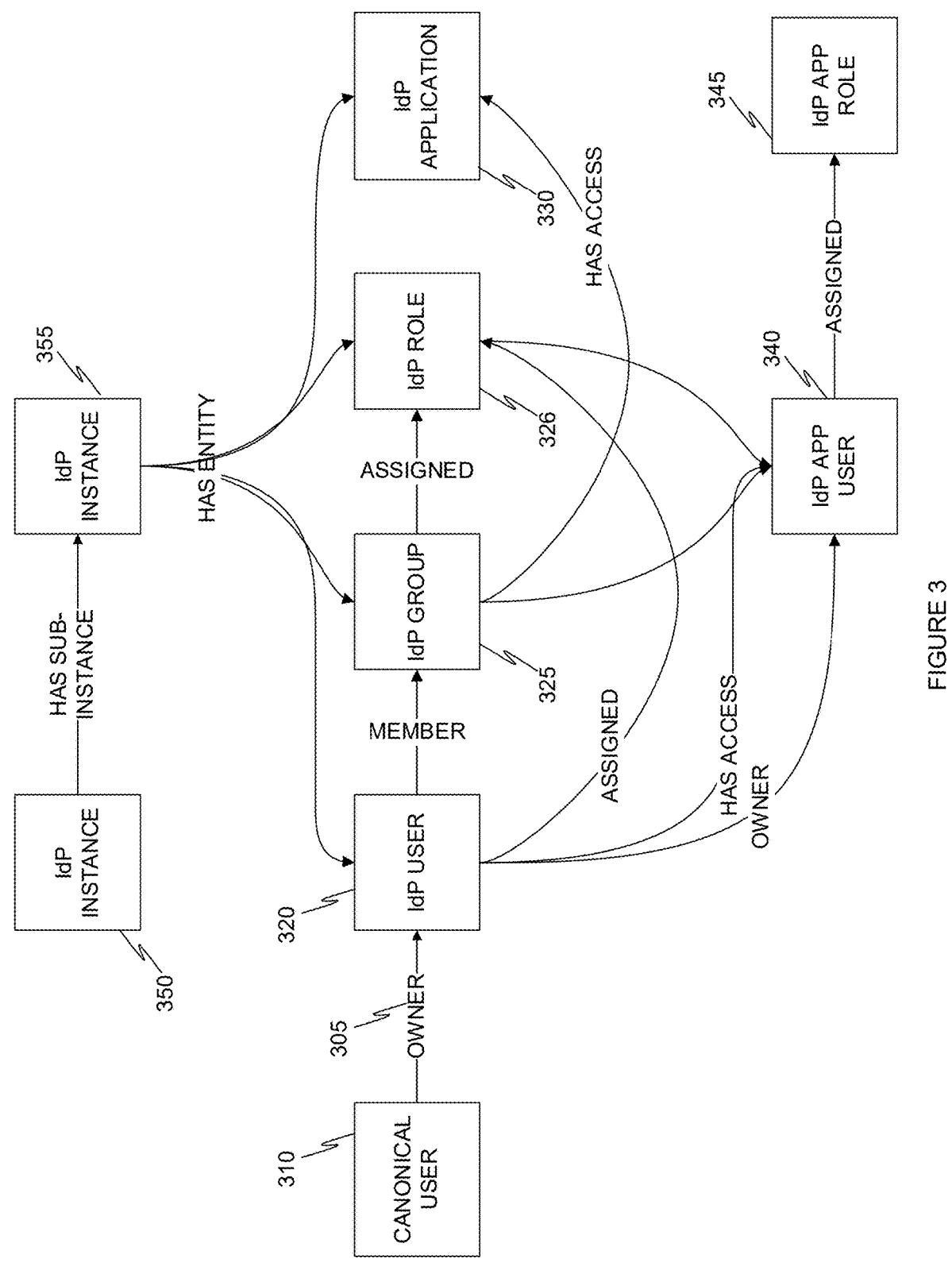
FIG. 3 is an example graph of an identity and permissions graph for determining effective permissions for an identity provider system, implemented according to an embodiment.

FIG. 3 is an example graph of an identity and permissions graph for determining effective permissions for an identity provider system, implemented according to an embodiment. In an embodiment, a canonical user is determined, and a representation thereof is generated in a graph database, such as ArangoDB®, Node4j®, and the like.

In some embodiments, a canonical user 310 is associated with one or more IdP user accounts, represented for example by IdP user account 320. In an embodiment, the representations are connected via edges in the graph, wherein an edge represents a relationship between two entities.

For example, the canonical user 310 is connected via an edge 305 to the IdP user account 320, which indicates that the canonical user 310 owns the IdP user account 320. In some embodiments, the IdP user account 320 is a member of an IdP group 325, which is assigned a role, represented by IdP role 326.

In an embodiment, an IdP instance 350 represents a deployment of an Identity Provider (IdP) system which is configured to authenticate and manage user identities for accessing applications, services, systems, and the like. In some embodiments, the IdP instance represented by the IdP instance 350 is configured to provide Single Sign-On (SSO), which enables users to log in once and access multiple resources securely.

An IdP instance handles identity verification, credential storage, and issuing tokens (e.g., SAML, OpenID Connect) for secure user authentication. Examples of IdPs include Okta, Azure AD, and Google Workspace. In cloud or enterprise setups, an IdP instance represents a specific implementation configured for an organization's authentication and authorization requirements.

In some embodiments, an IdP instance 350 has sub-instances, represented by IdP sub-instance 355. In an embodiment, the IdP user 320 is further connected to an IdP application 330 user account represented by an IdP app user 340 representation, which is assigned a role for a specific application, such as represented by IdP application role 345.

For example, in an embodiment, an Okta® instance includes authentication credentials for a software application for a user which is represented by IdP app user 340.

Figure 4:
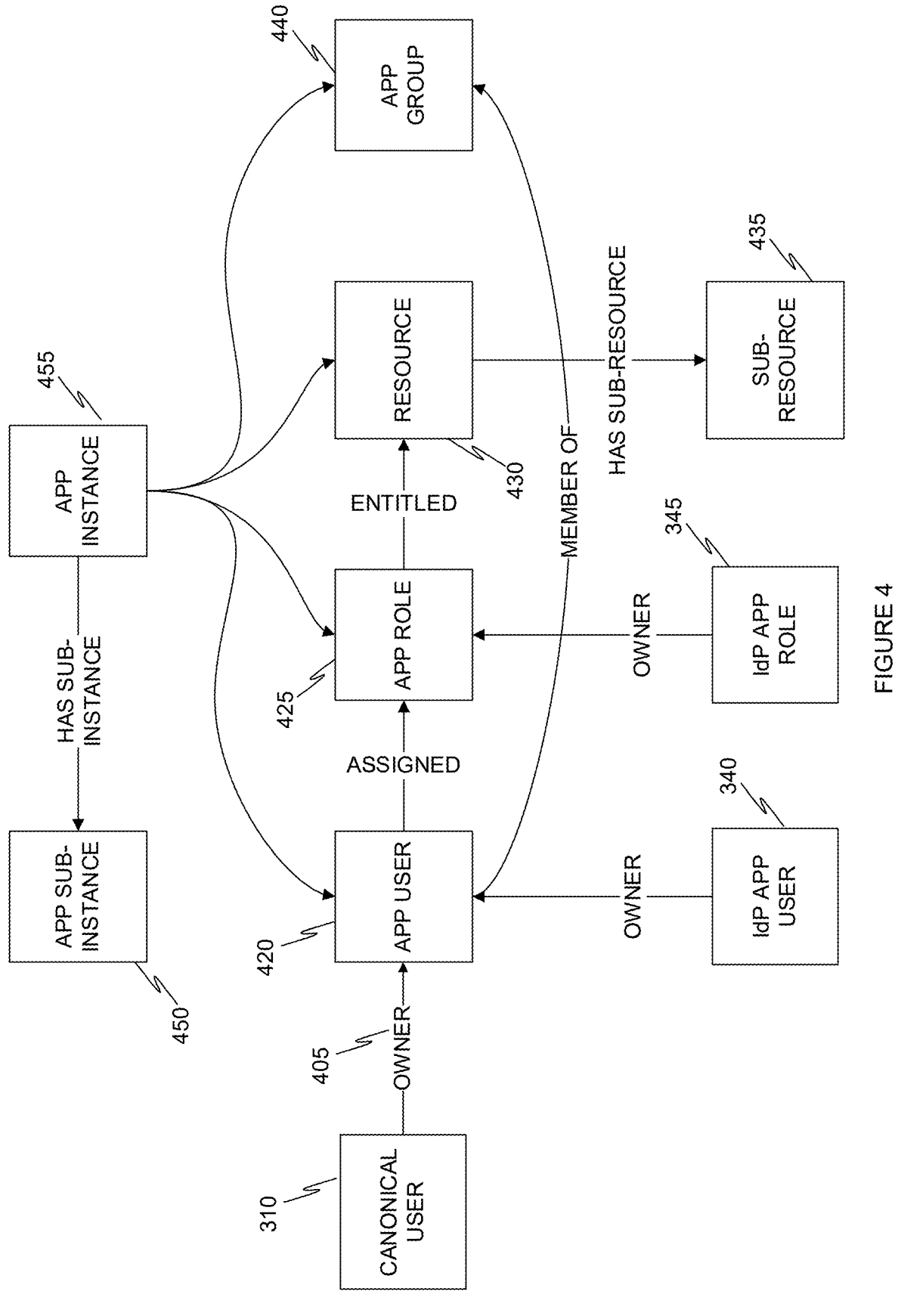
FIG. 4 is an example graph of an identity and permissions graph for determining effective permissions for a software application, implemented according to an embodiment.

FIG. 4 is an example graph of an identity and permissions graph for determining effective permissions for a software application, implemented according to an embodiment. In an embodiment, the canonical user 310 of FIG. 3 is further connected to a software application user account 420. The representation of the canonical user 310 is connected to the representation of the application user account 420 via an edge 405 which indicates that the canonical user 310 is an owner of the user account 420.

The user account 420 is assigned a role 425, which entitles the user account 420 to access a resource 430. In an embodiment, the resource 430 includes a sub-resource 435. For example, a cloud storage is a resource 430, and a specific bucket in the cloud storage is a sub-resource 435.

In some embodiments, the IdP application role 345 is an owner of the application role 425, and the IdP application user 340 is an owner of the application user 420. According to certain embodiments, the application user 420 is a member of an application user group 440.

By representing each identity entity, each permission, each resource, each application, etc., of a computing environment, an effective permission can be determined for each canonical user. Furthermore, this allows applying a policy on such a representation of a computing environment.

Figure 5:
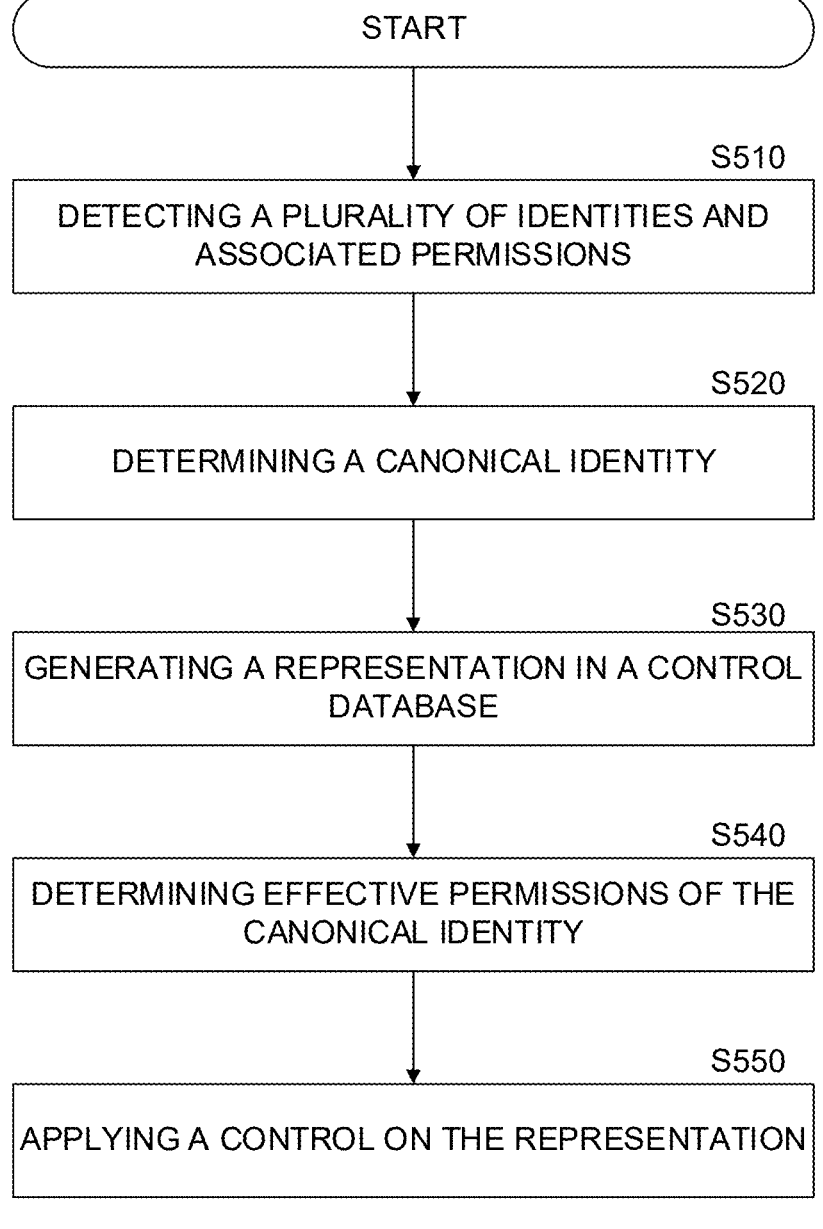
FIG. 5 is an example flowchart of a method for determining effective permissions and applying a control, implemented in accordance with an embodiment.

FIG. 5 is an example flowchart of a method for determining effective permissions and applying a control, implemented in accordance with an embodiment. In an embodiment, it is advantageous to determine an effective permission for a user. In some embodiments, an effective permission refers to the actual level of access a user, entity, principal, etc., has to a resource. This is derived, for example, from the combination of all permissions assigned directly or indirectly. An effective permission takes into account multiple factors, such as inherited permissions, role-based assignments, group memberships, deny overrides, exceptions, a combination thereof, and the like.

For example, in cloud computing environments, access control systems, etc., a user may have permissions from multiple roles. By determining effective permissions an intended security posture is maintained by reflecting the true access rights based on all applicable rules and policies to a specific user.

At S510, a plurality of identities are detected. In an embodiment, a first identity is detected respective of a first identity provider (IdP), and a second identity is detected respective of a second IdP. In some embodiments, a first identity is detected respective of a first application, and a second identity is detected respective of a second application.

In an embodiment, an identity is associated with a permission, a role, a user group, and the like. In some embodiments, an identity is associated with authorizations, for example via a policy. In an embodiment, an identity is detected in an IdP system, in an HRIS system, and the like.

In some embodiments, identities, principals, and the like, are detected in a cloud computing environment by querying an API of the cloud computing environment for principals deployed therein. In certain embodiments, the API of the cloud computing environment is further queried to determine permissions, access, authorization, and the like, which is associated with a principal, a group of principals, etc.

At S520, a canonical identity is determined. In an embodiment, a canonical identity refers to a single identity (e.g., a human user) which utilizes a user account, service account, application account, system account, local account, network account, email account, and the like.

In some embodiments, a plurality of identities are clustered into canonical identity groups, such that each group corresponds to a single canonical identity. In certain embodiments, identities of a first type of system are prioritized for determining a canonical identity over identities of a second type of system.

For example, in an embodiment, identities of a human resource information system (HRIS) are prioritized over identities of an IdP system. In some embodiments, prioritizing an identity includes determining that identities of the system (e.g., the HRIS) are each a unique canonical identity. Thus, other identities which are detected in other systems, are associated with the canonical identities which are determined based on the prioritized system. This is advantageous, according to an embodiment, as the HRIS is typically the most up to date in most organizations.

In an embodiment, determining a canonical identity includes associating the canonical identity with at least a user account of an application, a system, a software, and the like, deployed in a computing environment, coupled with the computing environment, providing a service to the computing environment, etc.

In some embodiments, associating a canonical identity with a user account includes determining a semantic similarity between the canonical identity and the user account. In certain embodiments, a semantic score, semantic similarity, and the like, are determined based on an identifier of a user account. In some embodiments, where the semantic similarity is above a predetermined threshold, the user account is determined to be associated with the canonical account.

In certain embodiments, where a user account is determined to be unassociated with any existing canonical account, a new canonical account is generated. In an embodiment, generating a canonical account includes generating a representation in a graph database of the canonical account.

At S530, a representation is generated in a control database. In an embodiment, a control database is implemented utilizing a graph database, such as ArangoDB®, Node4j®, and the like. In an embodiment, identities, principals, and the like, are represented as nodes in the graph, which are connected by edges.

In some embodiments, an edge represents a relationship between two nodes. For example, a relationship includes ownership, authorization to access, etc. In certain embodiments, a representation is generated for each canonical identity, each user account, each principal, each user group, each user role, each application instance, each resource, etc.

At S540, an effective permission is determined. In an embodiment, the effective permission is determined for each canonical user. This is advantageous in some embodiments, as it allows to present a single view of all the permissions, access, etc., which a certain human user (or entity) has access to, across multiple systems, user accounts, etc.

By determining effective permissions, it is possible to get an accurate representation of a cybersecurity posture. In an embodiment, the effective permission of a canonical user include every permission, access, authorization, exception, etc., which is applied to any user account, user role, etc., which is associated with the canonical user. In some embodiments, a first user account is configured to assume a role, a second user account, and the like. In such embodiments, the effective permission of the canonical user includes the permissions of the first user account and of the second user account.

At S550, a control is applied. In an embodiment, applying a control includes generating an insight. In some embodiments, the control is applied on the representation of the identities of the computing environment.

For example, according to an embodiment, a control includes a policy, a conditional rule, and the like, which when applied to the representation generates an output, such as by applying a Boolean logic. In some embodiments, this allows detection of off-boarded users, high risk users without MFA methods, provide just-in-time access, and the like.

In some embodiments, the control includes a condition, which when satisfied (or alternatively unsatisfied) results in initiation of a mitigation action in the computing environment. For example, in some embodiments, where a condition is satisfied, a mitigation action is initiated based on a user account in the computing environment.

For example, in an embodiment, where a user account is determined to have high permissions and no MFA is enable, a mitigation action is initiated which includes generating an alert. In some embodiments, the mitigation action includes revoking a permission, configuring an IAM service to temporarily revoke a permission, permanently revoke a permission, deny access to a resource, a combination thereof, and the like.

Figure 6:
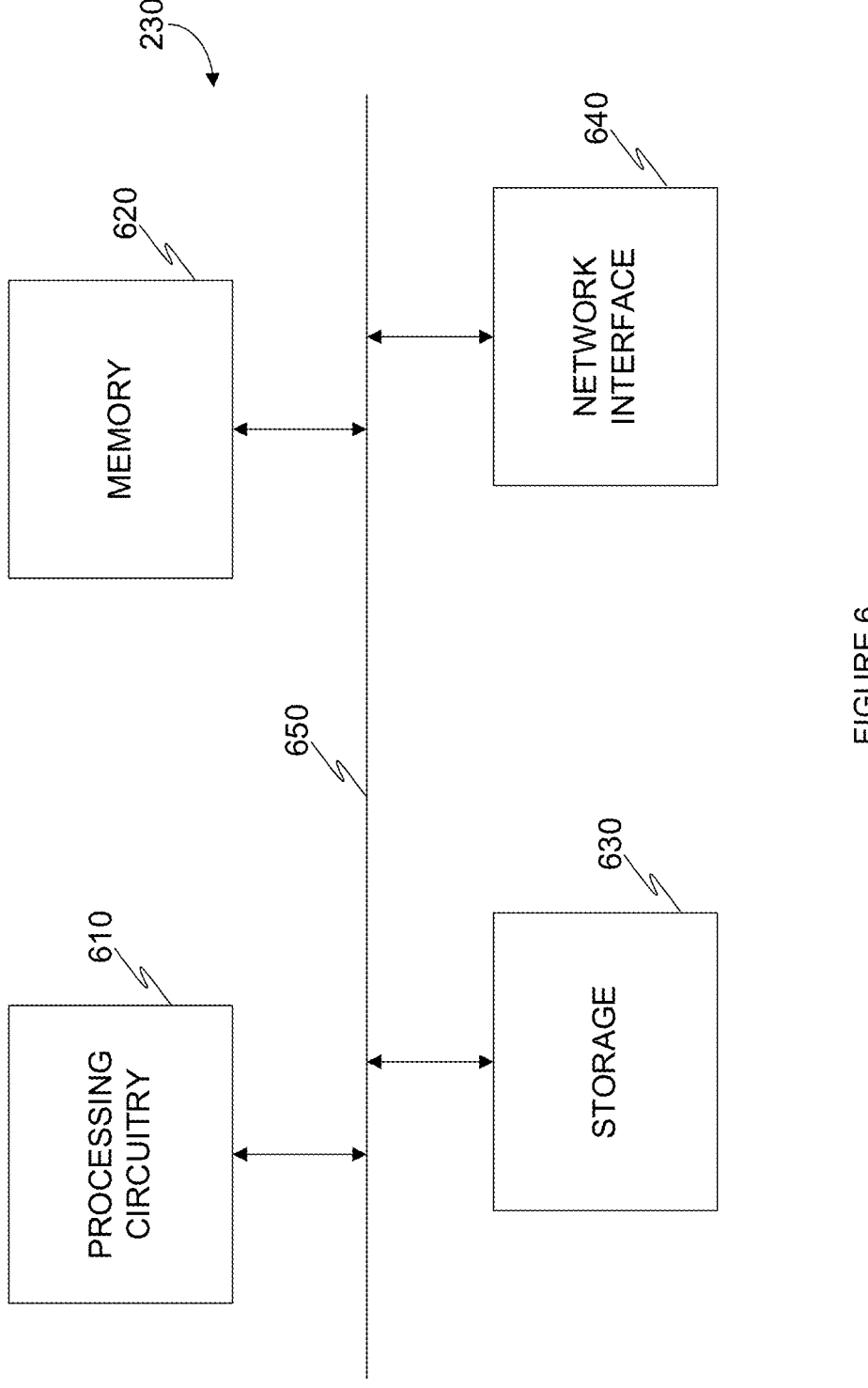
FIG. 6 is an example schematic diagram of an analyzer according to an embodiment.

FIG. 6 is an example schematic diagram of an analyzer 230 according to an embodiment. The analyzer 230 includes, according to an embodiment, a processing circuitry 610 coupled to a memory 620, a storage 630, and a network interface 640. In an embodiment, the components of the analyzer 230 are communicatively connected via a bus 650.

In certain embodiments, the processing circuitry 610 is realized as one or more hardware logic components and circuits. For example, according to an embodiment, illustrative types of hardware logic components include field programmable gate arrays (FPGAs), application-specific integrated circuits (ASICs), Application-specific standard products (ASSPs), system-on-a-chip systems (SOCs), graphics processing units (GPUs), tensor processing units (TPUs), Artificial Intelligence (AI) accelerators, general-purpose microprocessors, microcontrollers, digital signal processors (DSPs), and the like, or any other hardware logic components that are configured to perform calculations or other manipulations of information.

In an embodiment, the memory 620 is a volatile memory (e.g., random access memory, etc.), a non-volatile memory (e.g., read only memory, flash memory, etc.), a combination thereof, and the like. In some embodiments, the memory 620 is an on-chip memory, an off-chip memory, a combination thereof, and the like. In certain embodiments, the memory 620 is a scratch-pad memory for the processing circuitry 610.

In one configuration, software for implementing one or more embodiments disclosed herein is stored in the storage 630, in the memory 620, in a combination thereof, and the like. Software shall be construed broadly to mean any type of instructions, whether referred to as software, firmware, middleware, microcode, hardware description language, or otherwise. Instructions include, according to an embodiment, code (e.g., in source code format, binary code format, executable code format, or any other suitable format of code). The instructions, when executed by the processing circuitry 610, cause the processing circuitry 610 to perform the various processes described herein, in accordance with an embodiment.

In some embodiments, the storage 630 is a magnetic storage, an optical storage, a solid-state storage, a combination thereof, and the like, and is realized, according to an embodiment, as a flash memory, as a hard-disk drive, another memory technology, various combinations thereof, or any other medium which can be used to store the desired information.

The network interface 640 is configured to provide the analyzer 230 with communication with, for example, the computing environment 110, application 130, IdP 140, HRIS 150, a combination thereof, and the like, according to an embodiment.

It should be understood that the embodiments described herein are not limited to the specific architecture illustrated in FIG. 6, and other architectures may be equally used without departing from the scope of the disclosed embodiments.

Furthermore, in certain embodiments the analyzer 230, control database, security monitor system 120, a combination thereof, and the like, may be implemented with the architecture illustrated in FIG. 6. In other embodiments, other architectures may be equally used without departing from the scope of the disclosed embodiments.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more processing units ("PUs"), a memory, and input/output interfaces. The computer platform may also include an operating system and microinstruction code. The various processes and functions described herein may be either part of the microinstruction code or part of the application program, or any combination thereof, which may be executed by a PU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 20; 3A; A and B in combination; B and C in combination; A and C in combination; A, B, and C in combination; 2A and C in combination; A, 3B, and 2C in combination; and the like.

What is claimed is:

1. A method for identity modeling and effective permission management in a cloud computing environment, comprising:

accessing a first identity provider system to detect a first identity, the first identity including a first permission;

accessing a second identity provider system to detect a second identity, the second identity including a second permission;

generating in a control database a representation of a canonical identity;

generating in the control database a representation of the first identity, and a representation of the second identity;

generating in the control database a connection between canonical identity and:

the representation of the first identity, and the representation of the second identity;

generating a representation of the first permission and generating a representation of the second permission in the control database;

connecting the representation of the first permission to the representation of the first identity and connecting the representation of the second permission to the representation of the second identity;

determining an effective permission for the canonical identity based on each identity representation connected to the canonical identity;

determining a state of an identity connected to the canonical identity; and detecting a cybersecurity risk based on the determined state and the determined effective permission.

2. The method of claim 1, further comprising:

generating the connection between the canonical identity and the representation of the first identity and the representation of the second identity in response to determining that the first identity and the second identity are associated identities.

3. The method of claim 2, further comprising:

determining that the first identity and the second identity are associated identities in response to determining a similarity between the first identity and the second identity.

4. The method of claim 3, further comprising:

determining the similarity based on a computed semantic similarity.

5. The method of claim 1, further comprising:

detecting a third identity in a second identity provider system;

generating a representation of the third identity in the control database; and connecting the representation of the third identity to the canonical identity in response to determining that the third identity is associated with any one of: the canonical identity, the first identity, and the second identity.

6. The method of claim 5, further comprising:

generating a second canonical identity in response to determining that the third identity is not associated with any one of: the canonical identity, the first identity, and the second identity; and connecting the representation of the third identity to the second canonical identity.

7. The method of claim 1, further comprising:

applying a control on the effective permission.

8. The method of claim 7, further comprising:

initiating a mitigation action in the cloud computing environment in response to determining that a condition of the control is satisfied.

9. The method of claim 7, further comprising:

initiating a mitigation action in the cloud computing environment in response to determining that a condition of the control is not satisfied.

10. A non-transitory computer-readable medium storing a set of instructions for identity modeling and effective permission management in a cloud computing environment, the set of instructions comprising:

one or more instructions that, when executed by one or more processing circuitries of a device, cause the device to:

access a first identity provider system to detect a first identity, the first identity including a first permission;

access a second identity provider system to detect a second identity, the second identity including a second permission;

generate in a control database a representation of a canonical identity;

generate in the control database a representation of the first identity, and a representation of the second identity;

generate in the control database a connection between canonical identity and:

the representation of the first identity, and the representation of the second identity;

generate a representation of the first permission and generate a representation of the second permission in the control database;

connect the representation of the first permission to the representation of the first identity and connect the representation of the second permission to the representation of the second identity;

determine an effective permission for the canonical identity based on each identity representation connected to the canonical identity;

determine a state of an entity connected to the canonical identity; and detect a cybersecurity risk based on the determined state and the determined effective permission.

11. A system for identity modeling and effective permission management in a cloud computing environment comprising:

one or more processing circuitries configured to:

access a first identity provider system to detect a first identity, the first identity including a first permission;

access a second identity provider system to detect a second identity, the second identity including a second permission;

generate in a control database a representation of a canonical identity;

generate in the control database a representation of the first identity, and a representation of the second identity;

generate in the control database a connection between canonical identity and:

the representation of the first identity, and the representation of the second identity;

generate a representation of the first permission and generate a representation of the second permission in the control database;

connect the representation of the first permission to the representation of the first identity and connect the representation of the second permission to the representation of the second identity;

determine an effective permission for the canonical identity based on each identity representation connected to the canonical identity;

determine a state of an identity connected to the canonical identity; and detect a cybersecurity risk based on the determined state and the determined effective permission.

12. The system of claim 11, wherein the one or more processing circuitries are further configured to:

generate the connection between the canonical identity and the representation of the first identity and the representation of the second identity in response to determining that the first identity and the second identity are associated identities.

13. The system of claim 12, wherein the one or more processing circuitries are further configured to:

determine that the first identity and the second identity are associated identities in response to determining a similarity between the first identity and the second identity.

14. The system of claim 13, wherein the one or more processing circuitries are further configured to:

determine the similarity based on a computed semantic similarity.

15. The system of claim 11, wherein the one or more processing circuitries are further configured to:

detect a third identity in a second identity provider system;

generate a representation of the third identity in the control database; and connect the representation of the third identity to the canonical identity in response to determining that the third identity is associated with any one of:

the canonical identity, the first identity, and the second identity.

16. The system of claim 15, wherein the one or more processing circuitries are further configured to:

generate a second canonical identity in response to determining that the third identity is not associated with any one of:

the canonical identity, the first identity, and the second identity; and connect the representation of the third identity to the second canonical identity.

17. The system of claim 11, wherein the one or more processing circuitries are further configured to:

apply a control on the effective permission.

18. The system of claim 17, wherein the one or more processing circuitries are further configured to:

initiate a mitigation action in the cloud computing environment in response to determining that a condition of the control is satisfied.

19. The system of claim 17, wherein the one or more processing circuitries are further configured to:

initiate a mitigation action in the cloud computing environment in response to determining that a condition of the control is not satisfied.

* * * * *